United States Patent [19]
Takeuchi et al.

[11] Patent Number: 5,583,387
[45] Date of Patent: Dec. 10, 1996

[54] STATOR OF DYNAMO-ELECTRIC MACHINE

[75] Inventors: Manabu Takeuchi, Daito; Mikio Hirano, Tondabayashi; Yoshikazu Kinashi, Tsuzuki-gun; Yukitoshi Wada, Katano, all of Japan

[73] Assignee: Matsushita Electric Industrial Co., Ltd., Osaka-fu, Japan

[21] Appl. No.: 258,730

[22] Filed: Jun. 13, 1994

[30] Foreign Application Priority Data

Jun. 14, 1993 [JP] Japan ................ 5-141733

[51] Int. Cl.⁶ ................................................ H02K 1/12
[52] U.S. Cl. ....................... 310/217; 310/254; 310/42
[58] Field of Search ................. 310/42, 216, 217, 310/218, 254, 256, 258, 259, 192, 193

[56] References Cited

U.S. PATENT DOCUMENTS

| | | | |
|---|---|---|---|
| 1,756,672 | 4/1930 | Barr | 310/259 |
| 5,398,397 | 3/1995 | Johnson | 29/596 |

FOREIGN PATENT DOCUMENTS

| | | | |
|---|---|---|---|
| 2373907 | 7/1978 | France . | |
| 2033235 | 11/1971 | Germany . | |
| 8909259 | 12/1990 | Germany . | |
| 0020134 | 2/1982 | Japan | 310/215 |
| 1354338 | 11/1987 | U.S.S.R. | 310/217 |
| 1302093 | 1/1973 | United Kingdom . | |
| 2014374 | 8/1979 | United Kingdom . | |

*Primary Examiner*—Steven L. Stephan
*Assistant Examiner*—Judson H. Jones
*Attorney, Agent, or Firm*—Wenderoth, Lind & Ponack

[57] ABSTRACT

A stator of a dynamo-electric machine includes core pieces obtained by laminating iron plates divided in a circumferential direction per pole-tooth unit and having projecting and recessed engaging parts at their dividing faces, and then welding the iron plates by laser at their inner and outer peripheries. A winding part is formed around each pole-tooth unit of the core pieces. A predetermined number of the core pieces are bonded into the loop, with the projecting and recessed engaging parts engaged with each other and rigidly welded at outer peripheries of bonding faces by laser in a laminating direction.

4 Claims, 3 Drawing Sheets

5,583,387

STATOR OF DYNAMO-ELECTRIC MACHINE

BACKGROUND OF THE INVENTION

The present invention relates to the constitution of a stator of a dynamo-electric machine (referred to as a motor hereinafter) used mainly in industrial equipment.

High-density windings and space-saving performance at the ends of windings are increasingly required to realize compact and highly efficient motors. Particularly in order to catch up with the recent trend toward high-speed operation, space-savings, and high output characteristics of a robot, it is necessary to use a magnet of a considerably high magnetic flux density for a rotor of a servo motor of the robot and to increase the winding density of a stator. Although inserter winding has conventionally been practiced to achieve the high density winding, the technique has a demerit in that a large space is consumed at the end of the winding. Nowadays, therefore, the stator is constructed in most cases in such a manner that the core is divided and the winding is wound in alignment outside the stator, thereby achieving a winding with high density and saving space at the end of the winding.

The constitution of a conventional stator will first be described below.

FIG. 3 indicates the constitution of a stator in a first conventional example intended for high-density winding and the saving of space at an end of the winding. In FIG. 3, the reference numerals respectively represent: 21, a first core constituting the outside of a core; 22, a second core constituting the inside of the core; 23, a joint part connecting pole-tooth units of the second core 22 adjacent to each other; 24, an insulator; 25, a winding part; and 26, a resin part.

In the above constitution, the winding part 25 is wound in alignment outside the stator with a high density orthogonally to the insulator 24. A predetermined number of winding parts 25 are inserted into each pole-tooth unit of the second core 22. The second core 22 is then inserted in the inner periphery of the first core 21, thereby constituting a stator core. A stator is hence perfected in the integrated structure when the resin part 26 is formed.

FIGS. 4 and 5 show the constitution of a stator in a second conventional example. In the representative example of the stator in FIGS. 4 and 5, the outer periphery of a layered core is divided in the direction of an output shaft. In FIG. 4, the layered core 31 is divided in half by a dividing face 32. Reference numeral 33 denotes a winding part, and reference numeral 34 of FIG. 5 denotes a resin part.

In the constitution as above, the winding part 33 has a winding orthogonal to the outer periphery of the layered divided core 31. The divided parts of the core 31 are brought to butt against the dividing face 32 and integrated by means of the resin part 34.

The constitution of the first conventional example has disadvantages as follows:

1) Since the core constituting the stator is divided at the outer periphery of the pole-tooth units, the joint part 23 connecting the pole-tooth units at the radial inner peripheries is necessitated to constitute and maintain the second core 22.

2) The magnetism leaks between the pole-tooth units at the joint part 23, lowering the efficiency of the motor. Therefore it is required to make the joint part 23 as thin as possible.

3) Although it is necessary to provide the resin part 26 so as to secure the rigidity in the above constitution of the stator, an insulation coating of the winding part 25 is damaged when the resin part 26 is formed, thereby causing shortcircuiting between wires.

4) In accordance with the increase in size of the core, the pressing and forming plant of the core becomes large in scale, which results in the deterioration of the production efficiency.

According to the constitution of the second conventional example, since the winding part 33 is wound at right angles to the outer periphery of the layered core 31, the winding part 33 cannot be aligned and occupies the conductor merely by 52–55%. Although the space is saved at the end part of the winding, the winding part projects outward in the radial direction, thereby increasing the dimensions of the stator as a whole.

SUMMARY OF THE INVENTION

The object of the present invention is therefore to provide a stator of a dynamo-electric machine whereby a winding can be wound in alignment outside the stator with high density, the end part of the winding occupies less space, a joint part of pole-tooth units which could decrease the efficiency of the motor becomes unnecessary and also resin molding, used to secure rigidity, is not required. The stator is designed with a divided structure so that even a press plant of a small size will serve a large-size core for the stator.

In accomplishing these and other objects, according to one aspect of the present invention, there is provided a stator of a dynamo-electric machine comprising core pieces obtained by laminating iron plates divided in a circumferential direction per pole-tooth unit and having projecting and recessed engaging parts at their dividing faces, and then welding the iron plates by laser at their inner and outer peripheries. A winding part is formed around each pole-tooth unit of the core pieces, wherein a predetermined number of the core pieces are bonded into a shape of a loop with the projecting and recessed engaging parts engaged with each other and rigidly welded in outer peripheries of bonding faces by laser at a laminating direction.

BRIEF DESCRIPTION OF THE DRAWINGS

The above and other objects and features of the present invention will become clear from the following description taken in conjunction with the preferred embodiments thereof and with reference to the accompanying drawings, in which.

DETAILED DESCRIPTION OF THE PREFERRED EMBODIMENT

Figure 1:
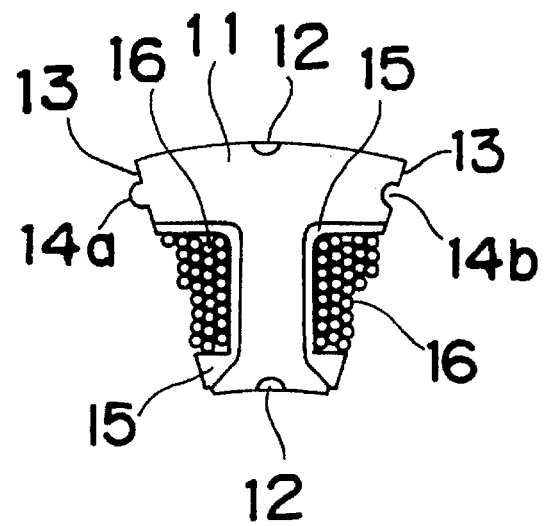
FIG. 1 is a sectional plan view of a complete piece of a layered core divided per pole-tooth unit according to one embodiment of the present invention.

Before the description of the present invention proceeds, it is to be noted that like parts are designated by like reference numerals throughout the accompanying drawings.

A preferred embodiment of the present invention will be described with reference to the corresponding drawings.

Figure 2:
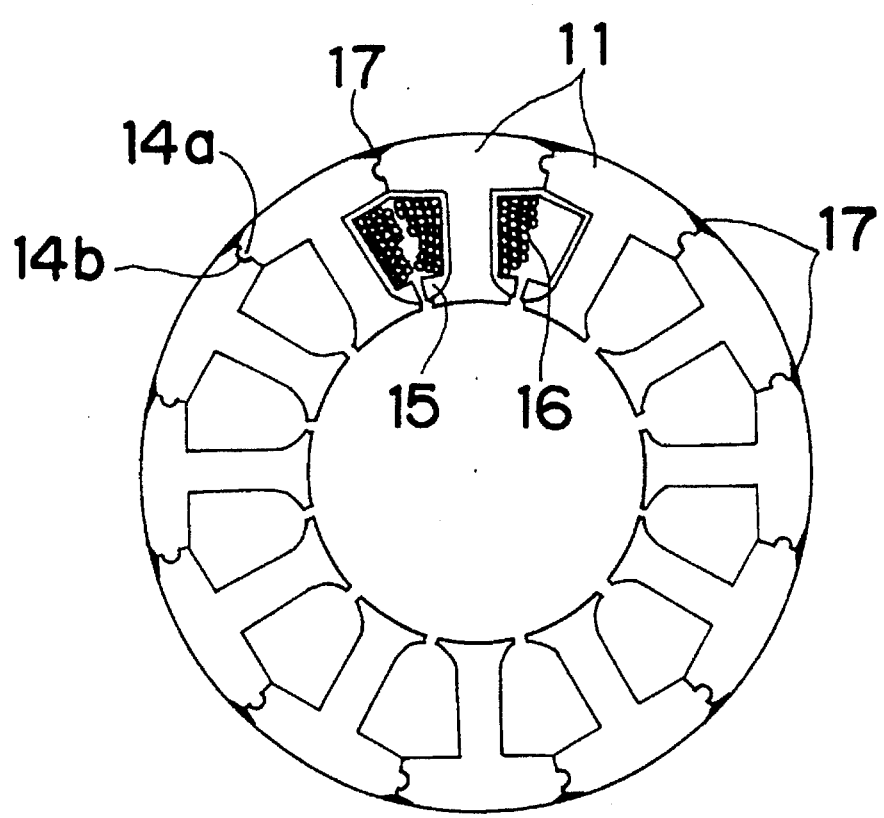
FIG. 2 is a sectional plan view of a stator having the divided pieces of the core bonded into the shape of a loop.
Figure 3:
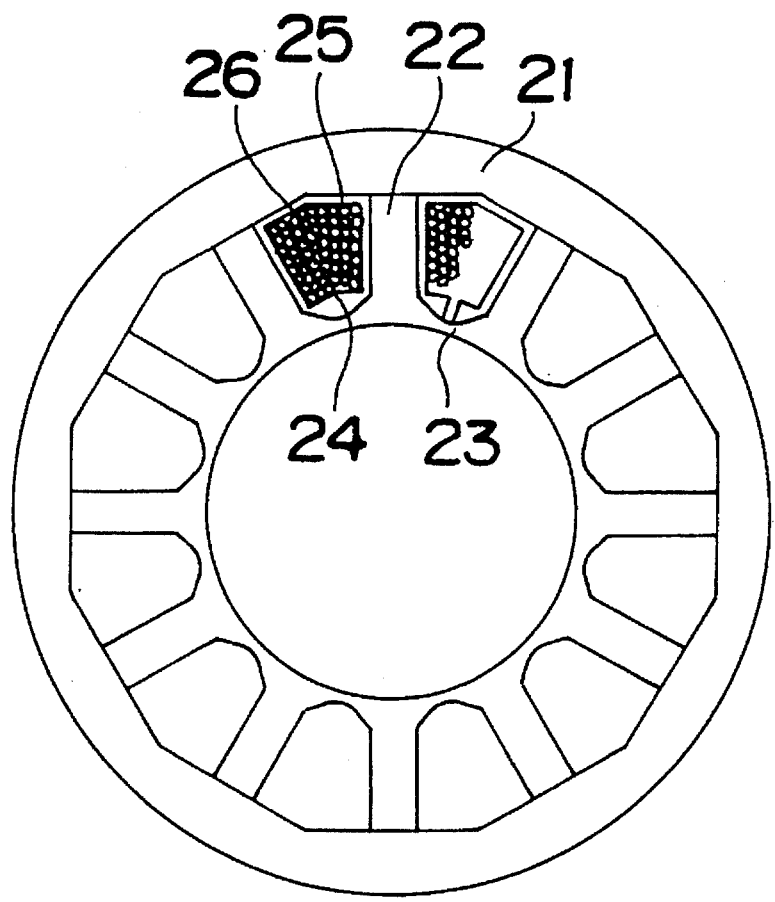
FIG. 3 is a sectional plan view of a stator in a first conventional example.
Figure 4:
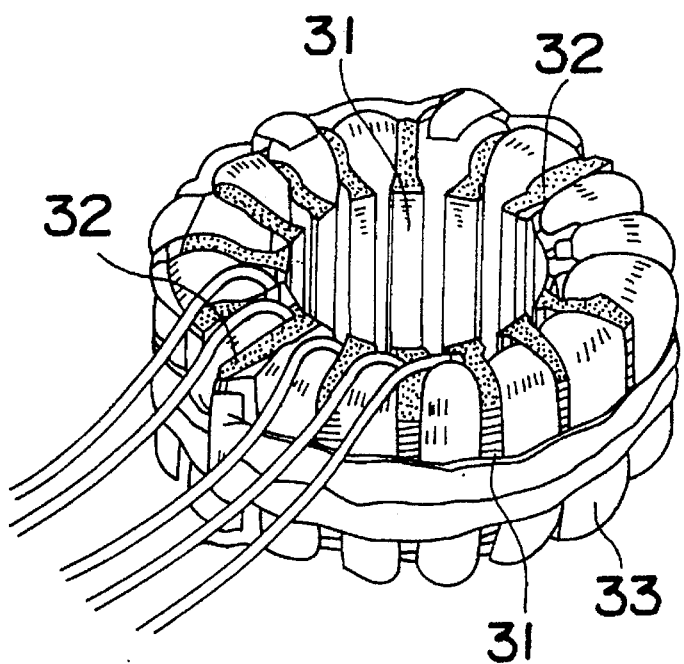
FIG. 4 is a perspective view indicative of the appearance of a stator before being sealed by resin in a second conventional example.
Figure 5:
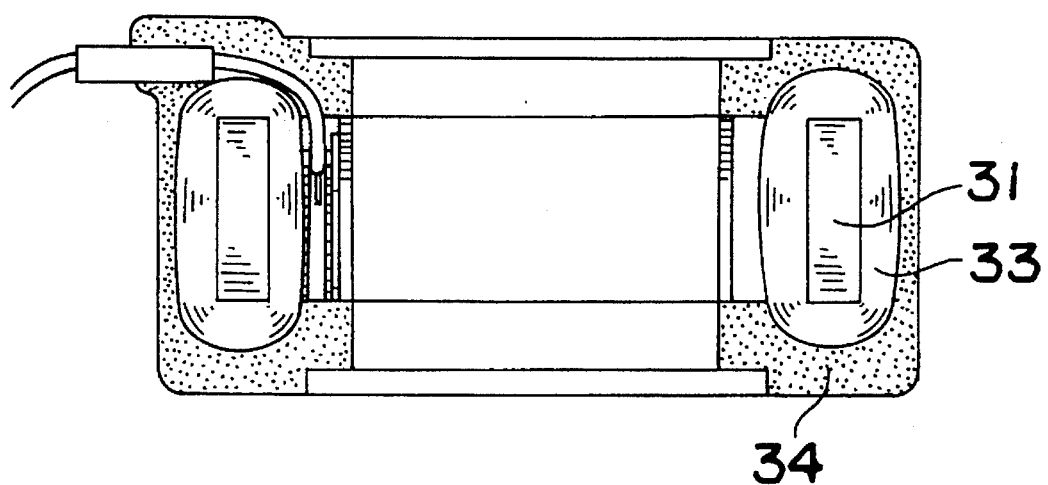
FIG. 5 is a side sectional view of the stator of FIG. 4.

FIG. 1 shows a completed piece of a layered core divided per pole-tooth unit and FIG. 2 is a completed stator of a motor composed of a predetermined number of the completed pieces bonded annularly.

The constitution of each of the above completed core piece and stator will now be discussed hereinbelow.

Referring to FIG. 1, a core piece 11 is obtained by layering core iron plates divided at each pole-tooth unit, i.e. per pole-tooth unit, and bonding the plates by laser at 12 on inner and outer peripheral surfaces so as to integrally connect the plates with each other. The core piece 11 has projecting and recessed engaging parts 14a and 14b formed on dividing faces 13. An insulating part 15 is formed at the pole-tooth unit of the core piece 11. A winding part 16 is formed on the insulating part 15 around the pole-tooth unit. A predetermined number of core pieces 11 are bonded to one another at bonding parts 17 into the shape of a loop with the projecting and recessed engaging parts 14a and 14b engaged with each other as shown in FIG. 2.

In the stator of the above-depicted constitution, the core pieces 11 are layered per pole-tooth unit by punching the iron plates in a small-size press plant and then bonding the plates by laser at the welding parts 12. Thereafter, the insulating part 15 is formed at the pole-tooth unit and then the winding part 16 is formed in alignment and with a high density by an external winding machine. Thereafter, a predetermined number of core pieces 11 are formed into the shape of a cylinder by fitting the engaging parts 14a and 14b at the dividing faces 13, and then the outer peripheral parts of the dividing faces 13 are rigidly welded by laser in the laminating direction to form the bonding parts 17. Accordingly, the stator is integrated with the required rigidity.

The pole-tooth unit is formed in a T-shape as shown in FIG. 1. The unit can also be formed in L-shape.

The above-described arrangement according to the present invention displays the following operations.

1) Since the core is divided per pole-tooth unit, a wire is wound in alignment for every piece of the core outside the stator at right angles to the pole-tooth unit with a high density (the occupying ratio of the conductor is 70%). Therefore, the stator becomes compact and space-saving at the end part of the winding.

2) A projecting or recessed engaging part is provided in the circumferential direction of each dividing face. After a predetermined number of core pieces are combined into the shape of a circular cylinder by fitting the engaging parts together, the outer peripheries of the core pieces are welded in the layered direction. Accordingly, with this constitution, the laser is prevented from entering the winding part and burning the winding during welding time. The welding is restricted to a small range, so that the effective length of the yoke is secured to maximum. Moreover, because of the rigidity of the stator being ensured, resin molding becomes unnecessary and shortcircuiting is prevented. Further, since a joint part for the pole-tooth units is not required to form and maintain the core, the 5–10% deterioration of the efficiency of the motor due to the joint part is prevented.

3) Since the core is divided per pole-tooth unit, the poles become thin, enabling the production of large-size cores even in a small press plant. Accordingly, the production efficiency is greatly improved.

Although the present invention has been fully described in connection with the preferred embodiments thereof and with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A stator for a dynamo-electric machine, comprising:

a plurality of core pieces, each of said core pieces having pole-tooth units, dividing faces, projecting and recessed engaging parts at said dividing faces and inner and outer peripheries, and each of said core pieces comprising a plurality of laminated iron plates that are laminated in a laminating direction and laser welded together at said inner and outer peripheries; and winding parts wound around respective said pole-tooth units of said core pieces;

wherein said plurality of core pieces form a rigid annular shape with said projecting and recessed engaging parts at said dividing faces engaging each other and said plurality of core pieces being laser welded together with a weld extending in the laminating direction at said outer periphery.

2. The stator of claim 1, and further comprising insulating parts located between each of said pole-tooth units and said winding parts.

3. The stator of claim 1, wherein each said core piece has an outer part connected with said pole-tooth unit thereof, said projecting and recessed engaging parts and said dividing faces being located on said outer part.

4. The stator of claim 3, wherein each said weld extending in the laminating direction is located on said outer parts of two of said core pieces so as to connect said core pieces together.

* * * * *